United States Patent [19]

Jones et al.

[11] Patent Number: 4,909,024

[45] Date of Patent: Mar. 20, 1990

[54] APPARATUS FOR TRIMMING LAWNS

[75] Inventors: Dallas W. Jones, New Hartford; Lauren J. Young, Poland, both of N.Y.; Matthew F. Orr, Shawnee Mission, Kans.

[73] Assignee: Trim-A-Lawn Corporation, Utica, N.Y.

[21] Appl. No.: 310,285

[22] Filed: Feb. 14, 1989

[51] Int. Cl.⁴ .................. A01D 34/67; A01D 34/74
[52] U.S. Cl. .................................. 56/16.7; 56/12.7; 56/320.1; 56/DIG. 9
[58] Field of Search .............. 56/17.4, 16.7, 17.2, 56/17.5, 252, 255, 320.1, 320.2, DIG. 9, 12.7

[56] References Cited

U.S. PATENT DOCUMENTS

| | | | |
|---|---|---|---|
| 2,502,696 | 4/1950 | Barnes | 56/17.4 X |
| 2,671,299 | 3/1954 | Orr | 56/17.2 |
| 3,496,707 | 1/1968 | Kobey | |
| 4,232,505 | 11/1980 | Walto | 56/12.7 |
| 4,341,060 | 7/1982 | Lowry et al. | 56/320.1 X |
| 4,351,143 | 9/1982 | Lessig, III | 56/320.1 X |
| 4,378,668 | 4/1983 | Gullett | 56/12.7 |
| 4,466,235 | 8/1984 | Cole | 56/16.9 |

FOREIGN PATENT DOCUMENTS 21371 of 1897 United Kingdom ................ 56/252

Primary Examiner—Jerome W. Massie
Assistant Examiner—David J. Bagnell
Attorney, Agent, or Firm—Shlesinger & Myers

[57] ABSTRACT

The present invention discloses an improved apparatus, for trimming lawns and the like, comprising a housing having a rear ground engaging means, a cutting means extending beyond the front and substantially the left and right sides of the housing for permitting trimming of vegetation growing close to an obstruction, a skirt for preventing debris from being propelled rearwardly by the cutting means, and a removable front ground engaging means.

24 Claims, 3 Drawing Sheets

APPARATUS FOR TRIMMING LAWNS

RELATED APPLICATIONS

The Assignee of the present invention is the owner of the following copending applications related to the present invention; Ser. No. 07/245,969, now U.S. Pat. No. 4,854,115, APPARATUS FOR CUTTING GRASS AND THE LIKE, continuation of Ser. No. 07/080,269, now abandoned; Ser. No. 07/156,597 now U.S. Pat. No. 4,819,416, A ROTARY CUTTING MEMBER FOR USE WITH LAWN MOWERS AND THE LIKE; Ser. No. 07/152,583, A HOUSING FOR LAWN TRIMMERS AND THE LIKE; Ser. No. 07/188,508, AN APPARATUS FOR TRIMMING LAWNS AND THE LIKE; Ser. No. 07/199,359, ROTARY CUTTING MEMBER WITH FLEXIBLE FILAMENTS FOR USE WITH LAWN MOWERS AND THE LIKE; and Ser. No. 07/275,560, A HOUSING FOR LAWN TRIMMERS AND THE LIKE.

FIELD OF THE INVENTION

The present invention pertains to an apparatus for trimming grass from around obstacles such as trees, fences, lightposts, walkways and the like.

BACKGROUND OF THE INVENTION

Lawn trimmers are either manual or powered by an electric motor or gasoline engine. Power lawn trimmers are typically hand-supported by an operator, which necessarily limits their size, weight and power. A hand-held trimmer, for example, cannot use a larger and generally heavier motor or engine because the operator can only safely handle a certain weight over a period of time. Any heavier weight will easily tire the operator and cause a potential safety hazard to him and to others. Thus, hand-held trimmers are limited in the type of work they can handle. Heavy trimming involving densely growing grass or vegetation generally requires a more powerful and heavier motor or engine and, therefore, may not be suitable for hand-held trimmers.

A shoulder harness has been used to help the operator support a heavier trimmer. However, in a situation where a trimmer has gone haywire, the harness may impede the operator from disengaging from it quickly enough to avoid any injury.

The cutting blade or filament normally associated with hand-held trimmers is usually only partially guarded from the operator. As a result, the cutting filament or blade can accidentally strike the operator or a person nearby when the operator loses control of the trimmer. Loss of control can occur due to fatigue from prolonged handling or due to the trimmer accidentally striking an obstacle.

OBJECTS AND SUMMARY OF THE INVENTION

It is therefore an object of the present invention to provide an improved power trimmer that is relatively easier to handle.

Another object of the invention is to provide a self-supported power trimmer.

A further object of the present invention is to provide a power trimmer which is safe to operate.

Still another object of the invention is to provide a power trimmer that can use a relatively heavier engine with relatively greater power for cutting dense vegetation.

Yet another object of the invention is to provide a power trimmer that can cut grass from around obstacles such as lamp posts, fences, trees, etc.

Another object of the invention is to provide a power trimmer that can cut grass from around obstacles from the left, right or front side of the trimmer.

Another object of the invention is to provide a power trimmer with removable front wheel assembly for permitting trimming around obstacles from the front of the trimmer.

A further object of the invention is to provide a power trimmer which prevents objects propelled by the trimmer blades from hitting the operator.

Yet another object of the invention is to provide a power trimmer which utilizes a flexible cutting blade for preventing potential injury to the operator.

Another object of the invention is to provide a power trimmer supported by at least two wheels.

In summary, the present invention provides an improved apparatus, for trimming lawns and the like, comprising a housing having a rear ground engaging means, a flexible cutting means extending beyond the front and substantially the left and right sides of the housing for permitting trimming of vegetation growing close to an obstruction, a skirt for preventing debris from being propelled rearwardly, cutting means, and a removable front grounding engaging means.

DETAILED DESCRIPTION OF THE INVENTION

Figure 1:
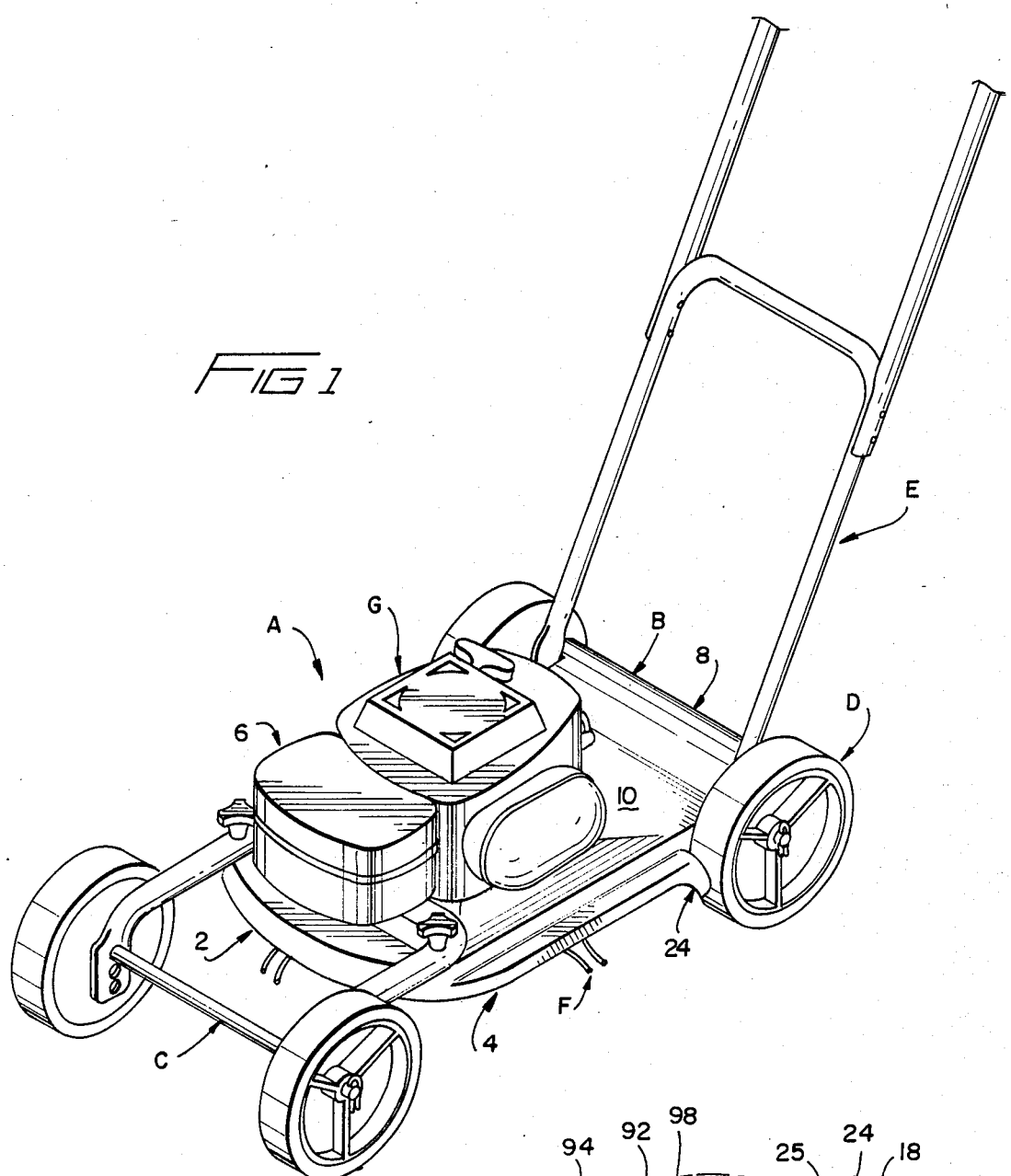
FIG. 1 is a fragmentary, perspective view of the power trimmer made in accordance with the invention.

As best shown in FIG. 1, power trimmer A comprises a housing B, front wheel assembly C, rear wheel assembly D, handle E, cutting blade F and engine G.

Housing B has a front side 2, left side 4, right side 6 and rear side 8. Housing B is preferably made from stamped sheet metal or other suitable materials of equal or greater strength.

Figure 2:
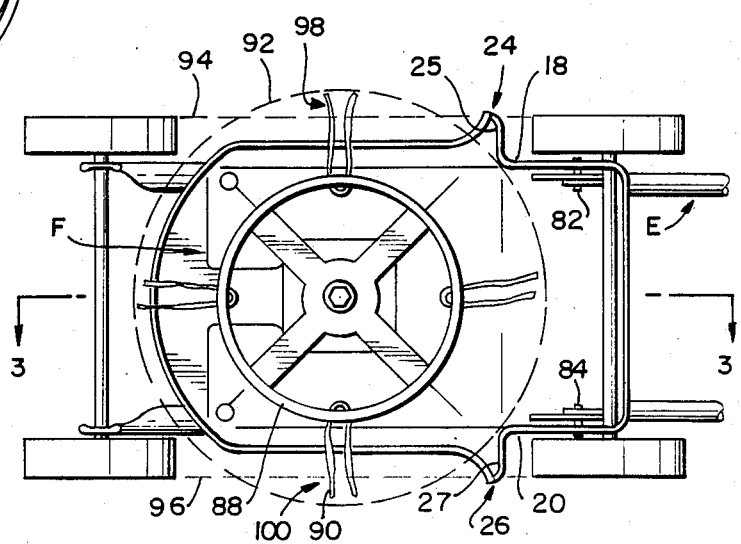
FIG. 2 is a fragmentary, bottom view, taken from FIG. 1, of the power trimmer made in accordance with the invention.
Figure 3:
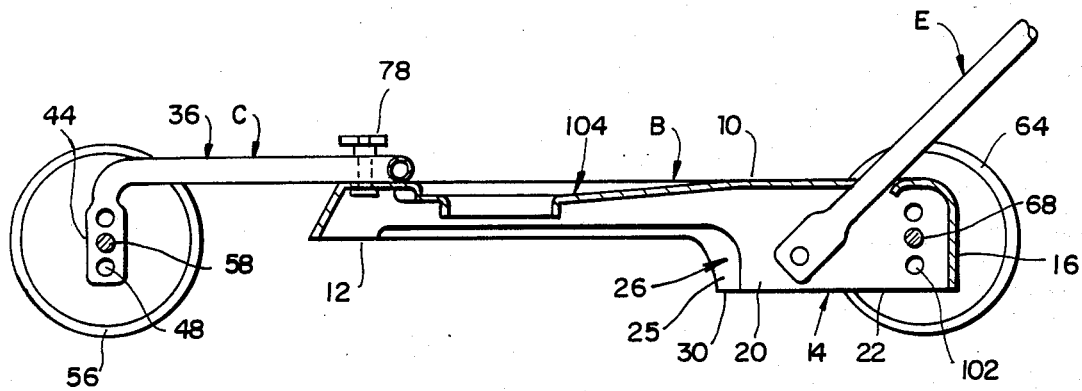
FIG. 3 is a fragmentary, sectional and side elevational view, along line 3—3 in FIG. 2, and viewed in the direction of the arrows, of the power trimmer made in accordance with the invention, and with the engine and the cutting means omitted from view.

As best shown in FIG. 3, housing B includes a top deck 10 having a lower edge 12, a skirt 14 having rear portion 16, left portion 18 (shown in FIG. 2), right portion 20 and a lower edge 22. Lower edge 12 of housing B is higher above the ground than lower edge 22 of skirt 14, for reasons which will be described below.

Housing B further includes left fender 24 and right fender 26, each extending laterally from respective left portion 18 and right portion 20 of skirt 14, as best shown in FIGS. 1 and 2. Left and right fenders 24 and 26 terminate in arcuate sections 25 and 27 which curve toward the front side 2 for deflecting debris propelled by cutting mean F toward the sides and to the front and away from the operator, as best shown in FIG. 2. Fenders 24 and 26 each includes a lower edge 30 which is substantially even with skirt lower edge 22, as best shown in FIG. 3. Skirt rear portion 16 and adjacent left and right portions 18 and 20, respectively, cooperate with fenders 24 and 26 to help prevent any flying debris from reaching the operator at the rear. Left and right fenders 24 and 26 are preferably integral with housing B.

Housing B is preferably a rigid, unitized structure, having no removable or bolted on sections.

Figure 4:
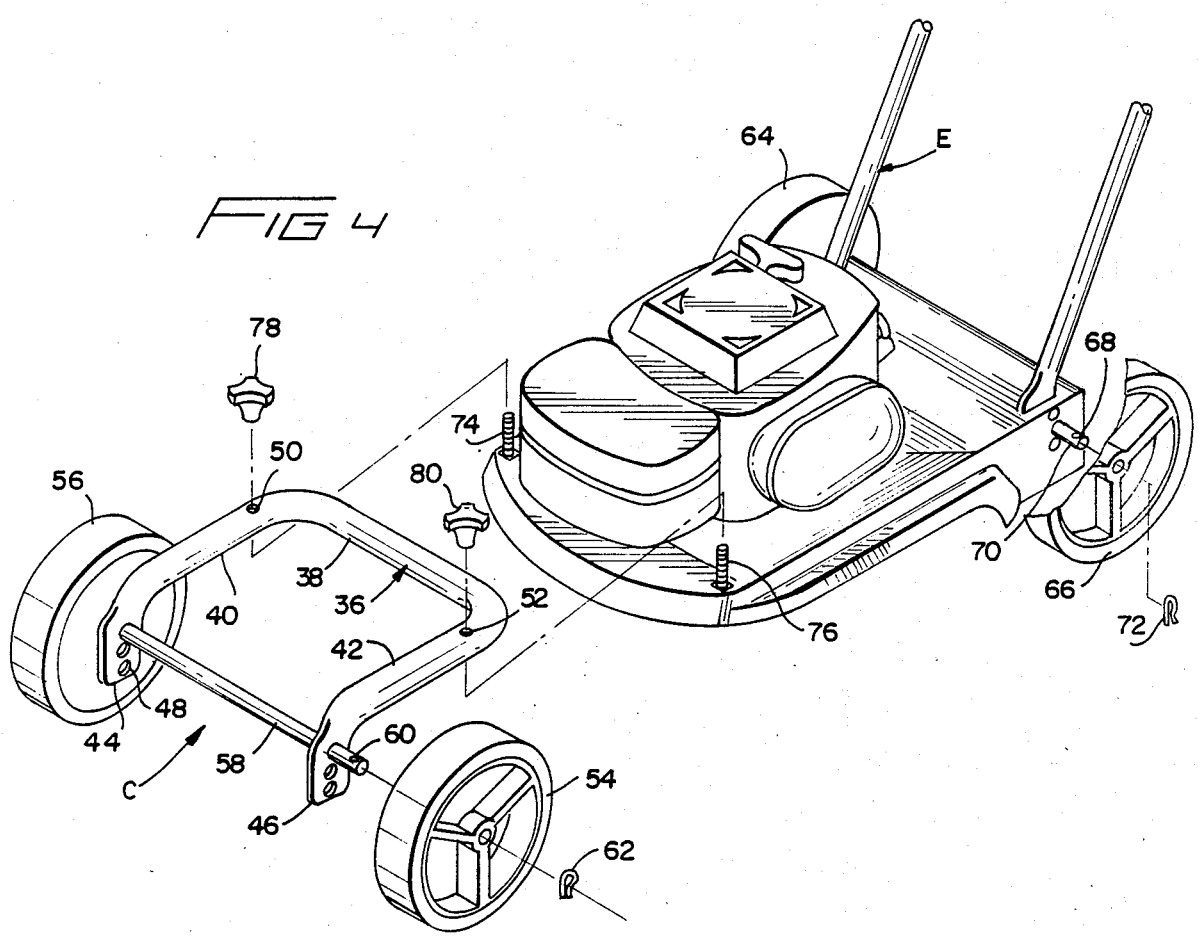
FIG. 4 is a fragmentary, exploded, perspective view, taken from FIG. 1, of the power trimmer made in accordance with the invention.

Front wheel assembly C includes a substantially U-shaped frame 36, preferably made from a metallic tubular material. As best shown in FIG. 4, frame 36 includes a base 38, arms 40 and 42 and end portions 44 and 46. End portions 44 and 46 each extends substantially transversely to each respective arms 40 and 42. End portions 44 and 46 include a plurality of cooperating pairs of holes 48 situated at different heights above the ground. Frame 36 further includes holes 50 and 52 which extend substantially transversely through respective arms 40 and 42 and disposed adjacent base 38. Front wheel assembly C includes front left wheel 54, front right wheel 56 and front axle 58. Front right wheel 56 is preferably fixedly attached to one end of front axle 58, while front left wheel 54 is preferably removably mounted at the other end of front axle 58. A hole 60, extending substantially diametrically through the other end of front axle 58, cooperates with a standard resilient fastener 62 for quick mounting and removal of front left wheel 54 from front axle 58 and removal of front axle 58 from frame 36.

Rear wheel assembly D includes rear right wheel 64, rear left wheel 66 and rear axle 68. Rear right wheel 64 is preferably fixedly attached to one end of rear axle 68, while rear left wheel 66 is preferable removably mounted at the other end of rear axle 68. Hole 70, extending substantially diametrically through the other end of rear axle 68 cooperates with a resilient fastener 72 for providing quick mounting and removal of left rear wheel 66 from rear axle 68.

Studs 74 and 76 are secured to the front side 2 of housing B and each projects upwardly and cooperates with holes 50 and 52 in frame 36. Wing nuts 78 and 80 each cooperates with studs 74 and 76 for securing frame 36 to housing B. Wing nuts 78 and 80 are easily tightened or loosened by hand without use of any tools so that front wheel assembly C can be easily mounted to or removed from housing B in the field by merely using the operator's hand and without any aid of any tool. In this manner, the operator is not interrupted by otherwise going back to the house to look for a tool, when the operator decides to remove from or install front wheel assembly C to housing B.

Handle E can be any conventional type and is secured to housing B by standard fasteners 82 and 84, as best shown in FIG. 2.

Figure 5:
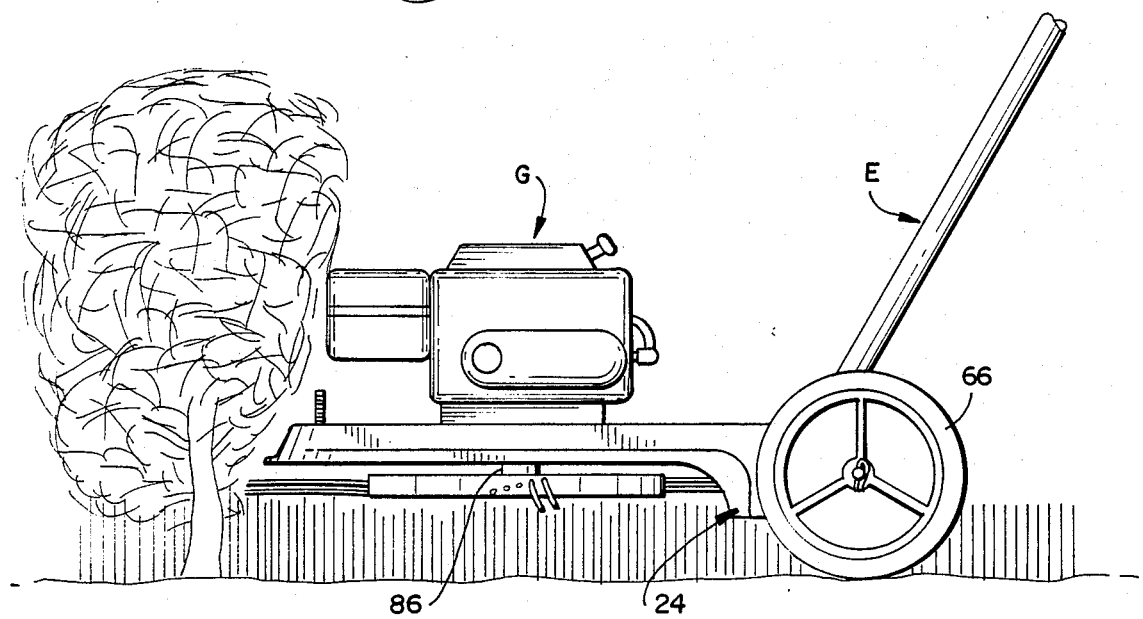
FIG. 5 is a fragmentary, environmental, side elevational view taken from FIG. 1 of the power trimmer made in accordance with the invention and showing the front wheel assembly removed.

Cutting blade F includes a rotary member 88 and a plurality of flexible filaments 90 operably associated with the rotary member 88, as best shown in FIG. 2. The outer extremities of flexible filaments 90 generate an operable circle 92 while cutting blade F is rotating. A portion of the periphery of operable circle 92 extends beyond the front 2 of housing B and beyond the left and right sides 4 and 6, respectively. Since the lower edge 12 of housing B is higher above the ground than the lower edge 22 of skirt 14, a portion of the periphery of operable circle 92 of cutting blade F extends beyond the front side 2 and substantially the left and right sides 4 and 6, respectively. Skirt rear portion 16 and adjacent left and right portions 18 and 20 provide a shield over the rear portion of cutting blade operable circle 92, thereby providing a safety guard for the operator, as best shown in FIG. 5. A portion of the outer periphery of operable circle 92 also extends beyond imaginary vertical planes 94 and 96 defined bY the outer surfaces of corresponding front and rear wheels on the left and right sides 4 and 6 of housing B, as indicated generally at 98 and 100, as best shown in FIG. 2. This feature permits power trimmer A to trim around obstacles such as lamp posts, fences, curbs, etc., without interference from the front and rear wheels. Cutting blade F can be similar to copending applications, Ser. Nos. 07/156,597, now U.S. Pat. No. 4,819,416 and Ser. No. 07/199,359 or any standard rigid lawn mower blade, as long as blade F generates the operable circle 92 as described above. However, it is suggested that blade F should be of the flexible filament type to reduce the risk of injury to the operator.

Cutting blade F is secured by a conventional method to drive shaft 86 of engine G, as best shown in FIG. 5.

A plurality of cooperating pairs of holes 102 are disposed in skirt portions 18 and 20, as best shown in FIG. 3. Holes 102 are situated at various heights above the ground. Holes 48 in frame 36 and holes 102 permit vertical adjustment of housing B at different heights above the ground, thus allowing cuttinq blade F various cutting heights. By removing resilient fasteners 60 and 70 from front axle 58 and rear axle 68, respectively, front axle 58 and rear axle 68 are easily removed from their presently occupying cooperating pair of holes 48 and 102 and relocated to a different cooperating pair of holes of a different height. In this manner the changeover to a different cutting height for cutting blade F is easily and conveniently made without use of any tools.

Top deck 10 of housing B includes a depression generally indicated as 104, as best shown in FIG. 3. Depression 104 allows the installation of engine G with a shorter drive shaft 86 than would otherwise be possible. Note that the operable circle 92 of cutting blade F must extend below and beyond lower edge 12 of housing B. Without depression 104, drive shaft 86 would be relatively longer to permit operable circle 92 of cutting blade F to extend below lower edge 4 of housing B and beyond front, left and right sides 2, 4 and 6, respectively, of housing B. Depression 104 also permits the engine G to be relatively closer to the ground, thus lowering the center of gravity of power trimmer A. A lower center of gravity makes power trimmer A relatively more stable.

OPERATION

Power trimmer A is used by starting engine G, which may be electric or gasoline powered. Power trimmer A is maneuvered around lamp posts, fences, curbs, etc., such that either the left side 4 or right side 6 of housing B is brought up against the obstacle. Since cutting blade F extends beyond the housing B as described above, the operator can simply bring trimmer A around the obstacles without having to uncover and expose cutting blade F. Front wheel assembly C and rear wheel assembly B support the weight of power trimmer A, including the weight of engine G, such that the operator does not have to carry the weight of power trimmer A, as in hand-held trimmers. In this way, the operator has a better control over power trimmer A. Moreover, power trimmer A can support various engine sizes, such as heavier and more powerful engines for trimming dense vegetation. In hand-held trimmers, use of heavier and more powerful engines is not practical and can be dangerous.

In a situation which requires that trimming be done from the front side 2 of the housing B, the operator stops the engine and removes wing nuts 78 and 80 by hand. The operator does not need any tools for unscrewing wing nut 78 and 80 since they are designed to be operated by hand. After removing wing nuts 78 and 80, the operator then lifts frame 38 from studs 74 and 76 and separates front wheel assembly C from housing B. By removing front wheel assembly C from housing B, a portion of the operable periphery of cutting blade F at the front side 2 of housing B is then freed from interference from front wheel assembly C. Thus, the operator, after restarting the engine G, simply brings trimmer A towards the obstruction and trims the vegetation from the front as best shown in FIG. 5. Since front side 2 of housing B is arcuate and non-intersecting with operable circle 92, the operable periphery of cutting blade F is exposed and extends beyond the whole front side 2. Preferably, arcuate front side 2 is concentric with drive shaft 86. Note that trimmer A continues to be supported by rear wheel assembly D, requiring little effort from the operator for maneuvering power trimmer A.

While this invention has been described as having preferred design, it is understood that it is capable of further modification, uses and/or adaptations of the invention following in general the principle of the invention and including such departures from the present disclosure as come within known or customary practice in the art to which the invention pertains, and as may be applied to the essential features set forth, and fall within the scope of the invention or the limits of the appended claims.

We claim:
1. An apparatus for trimming around obstructions on lawns and the like, comprising:
   (a) a housing;
   (b) rotatable cutting means for mounting in said housing for trimming vegetation;
   (c) said housing having front and rear portions;
   (d) said housing including a top deck;
   (e) said top deck having a periphery including first and second lower edges;
   (f) said housing including a skirt at said rear portion for preventing debris from being propelled rearwardly by said cutting means;
   (g) at least a portion of said first lower edge being substantially higher above the ground than said second lower edge for permitting an operable portion of said cutting means when rotating to extend below and beyond said at least portion of said first lower edge ;while staying above said second lower edge, thereby permitting trimming of vegetation growing close to said obstruction while preventing debris from being propelled rearwardly;
   (h) rear ground engaging means for permitting said housing to be moved on said lawn during trimming;
   (i) front ground engaging means for permitting said housing to be moved on said lawn during trimming;
   (j) means for releasably mounting said front ground engaging means to said front portion of said housing, thereby permitting separation of said front ground engaging means from said housing when trimming from said front portion of said housing vegetation growing close to said obstruction;
   (k) said releasable mounting means including a substantially U-shaped frame extending outwardly and forwardly from said front portion of said housing; and
   (l) said frame including a base releasably secured to said front portion of said housing and first and second arms operably associated with said front ground engaging means; and
   (m) drive means for said cutting means.
2. An apparatus, as in claim 1, wherein:
   (a) said releasable mounting means includes means for adjusting the height of said front portion of said housing above the ground.
3. An apparatus as in claim 2, wherein:
   (a) said first and second arms of said frame includes first and second end portions, respectively, extending downwardly from said first and second arms; and
   (b) said height adjusting means is operably associated with said first and second end portions.
4. An apparatus as in claim 3, wherein:
   (a) said height adjusting means includes a plurality of cooperating pairs of holes disposed in said first and second portions at different heights above the ground for rotatably mounting said front ground engaging means in any of said plurality of cooperating pairs of holes, thereby raising or lowering said front portion of said housing above the ground.
5. An apparatus as in claim 4, wherein:
   (a) said front ground engaging means includes at least a wheel.
6. An apparatus as in claim 5, wherein:
   (a) said front ground engaging means includes at least a pair of wheels.
7. An apparatus, as in claim 1, wherein:
   (a) said housing includes means for adjusting the height of said rear portion of said housing above the ground.
8. An apparatus as in claim 7, wherein:
   (a) said adjusting means includes a plurality of holes at different heights above the ground for mounting said rear ground engaging means thereby raising or lowering said rear portion of said housing above the ground.
9. An apparatus as in claim 8, wherein:
   (a) said rear ground engaging means includes at least a wheel.
10. An apparatus, as in claim 1, wherein:
    (a) said front portion of said housing is arcuate for permitting said operable portion of said cutting means to extend beyond a substantial portion of said front portion.
11. An apparatus as in claim 1, wherein:
    (a) said housing includes fender means cooperating with said skirt for directing debris propelled by said cutting means substantially sidewardly.
12. An apparatus as in claim 11, wherein:
    (a) said skirt includes left and right side portions; and
    (b) said fender means extends laterally from each of said left and right side portions.
13. An apparatus as in claim 12, wherein:

(a) each of said fender means is disposed forwardly of said rear ground engaging means.

14. An apparatus for trimming around obstructions on lawns and the like, comprising:
(a) a housing;
(b) a rotatable cutting means for mounting in said housing for trimming vegetation;
(c) said housing having front and rear portions;
(d) said housing including a top deck;
(e) said top deck having a periphery including first and second lower edges;
(f) said housing including a skirt at said rear portion for preventing debris from being propelled rearwardly by said cutting means;
(g) said first lower edge being substantially higher above the ground than said second lower edge for permitting an operable portion of said cutting means when rotating to extend below and beyond said first lower edge while staying above said second lower edge, thereby permitting trimming of vegetation growing close to said obstruction while preventing debris from being propelled rearwardly;
(h) at least a rear wheel being operably associated with said housing;
(i) a front wheel assembly;
(j) means operable from above said top deck for releasably mounting said front wheel assembly to said front portion of said housing for permitting separation of said assembly from said housing when trimming from said front portion of said housing vegetation growing close to said obstruction; and
(k) drive means for said cutting means.

15. An apparatus as in claim 14, wherein:
(a) said rotatable cutting means includes flexible cutting elements.

16. An apparatus for trimming around obstructions on lawns and the like, comprising:
(a) a housing;
(b) a rotatable cutting means for mounting in said housing for trimming vegetation;
(c) said housing having front and rear portions;
(d) said housing including a top deck;
(e) said top deck having a periphery including first and second lower edges;
(f) said housing including a skirt at said rear portion for preventing debris from being propelled rearwardly by said cutting means;
(g) at least a portion of said first lower edge being substantially higher above the ground than said second lower edge for permitting an operable portion of said cutting means when rotating to extend below and beyond said at least portion of said first lower edge while staying above said second lower edge, thereby permitting trimming of vegetation growing close to said obstruction while preventing debris from being propelled rearwardly;
(h) rear ground engaging means for permitting said housing to be moved on said lawn during trimming;
(i) front ground engaging means for permitting said housing to be moved on said lawn during trimming;
(j) means operable from above said top deck for releasably mounting said front ground engaging means to said front portion of said housing, thereby permitting separation of said front ground engaging means from said housing when trimming from said front portion of said housing vegetation growing close to said obstruction; and
(k) drive means for said cutting means.

17. An apparatus as in claim 16, wherein:
(a) said releasable mounting means includes a frame extending outwardly from said front portion of said housing.

18. An apparatus as in claim 17, wherein:
(a) said frame includes a base releasably secured to said front portion of said housing.

19. An apparatus as in claim 17, wherein:
(a) said frame is secured to said top deck.

20. An apparatus for trimming around obstructions on lawns and the like, comprising:
(a) a housing;
(b) rotatable cutting means for mounting in said housing for trimming vegetation;
(c) said housing having front and rear portions;
(d) said housing including a tip deck;
(e) said top deck having a periphery including first and second lower edges;
(f) said housing including a skirt at said rear portion for preventing debris from being propelled rearwardly by said cutting means;
(g) at least a portion of said first lower edge being substantially higher above the ground than said second lower edge for permitting an operable portion of said cutting means when rotating to extend below and beyond said at least portion of said first lower edge while staying above said second lower edge, thereby permitting trimming of vegetation growing close to said obstruction while preventing debris from being propelled rearwardly;
(h) rear ground engaging means for permitting said housing to be moved on said lawn during trimming;
(i) front ground engaging means for permitting said housing to be moved on said lawn during trimming;
(j) means for releasably mounting said front ground engaging means to said front portion of said housing, thereby permitting separation of said front ground engaging means from said housing when trimming from said front portion of said housing vegetation growing close to said obstruction;
(k) said releasable mounting means including means for mounting said front ground engaging means forwardly of said front portion of said housing and forwardly of said operable portion of said cutting means; and
(l) drive means for said cutting means.

21. An apparatus as in claim 20, wherein:
(a) said releasable mounting means includes a frame extending outwardly from said front portion of said housing.

22. An apparatus as in claim 21, wherein:
(a) said frame is substantially U-shaped extending outwardly and forwardly from said front portion of said housing.

23. An apparatus as in claim 22, wherein:
(a) said frame includes a base releasably secured to said front portion of said housing and first and second arms operably associated with said front ground engaging means.

24. An apparatus as in claim 21, wherein:
(a) said frame is secured to said top deck.

* * * * *